March 8, 1966 J. E. G. YOUNG 3,238,723
HYDROSTATIC TRANSMISSION
Filed Feb. 17, 1964 2 Sheets-Sheet 1
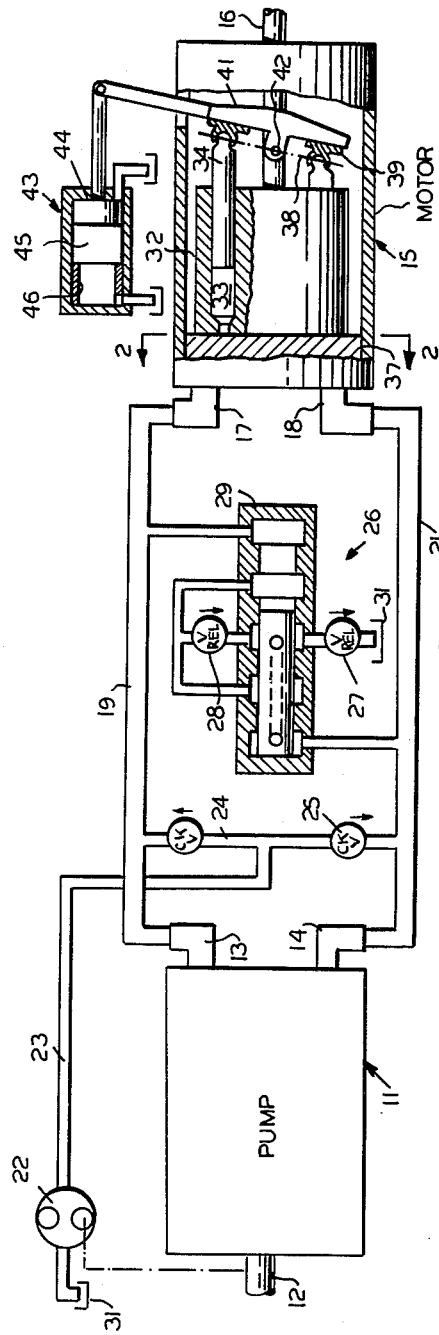
INVENTOR
JOHN E.G. YOUNG
BY Dodge and Sons
ATTORNEYS March 8, 1966     J. E. G. YOUNG     3,238,723

HYDROSTATIC TRANSMISSION

Filed Feb. 17, 1964     2 Sheets-Sheet 2

INVENTOR
JOHN E. G. YOUNG

BY *Dodge and Sons*

ATTORNEYS 3,238,723
HYDROSTATIC TRANSMISSION
John E. G. Young, Watertown, N.Y., assignor to The New York Air Brake Company, a corporation of New Jersey
Filed Feb. 17, 1964, Ser. No. 345,146
14 Claims. (Cl. 60—53)

This invention relates to hydrostatic transmissions, and particularly to hydrostatic transmissions for use in installations wherein the driven load may overrun the transmission motor.

A typical hydrostatic transmission includes a variable displacement pump, a fixed displacement motor, and a pair of main conduits which connect the pump and motor in a closed transmission circuit. Frequently, both the pump and the motor are of the rotary cylinder barrel, longitudinally reciprocating piston type wherein the pistons are mounted in a circular series of cylinder bores and have projecting ends which bear directly, or indirectly through shoes, on a cam plate that serves to move them on their discharge strokes. The force acting on each piston has a component that is normal to the axis of the piston and which is placed in equilibrium by a reaction force supplied by the wall of the cylinder bore and which acts in the region of a bearing area near its open end. It is recognized in the art that for any given angle of the cam plate with respect to the axis of rotation, the maximum tolerable magnitude of the reaction force is a function of the product of the pressure in the cylinder bore and the sliding velocity of the piston, commonly termed the PV factor. Each hydraulic unit has an allowable PV limit, and it is essential that this limit not be exceeded in operation if seizure of the pistons is to be avoided. This is one reason why hydrostatic transmissions employing hydraulic units of theis type usually include an override mechanism that serves during normal operation to reduce displacement of the pump as operating pressure increases.

When transmissions of the kind discussed above are used to drive loads of large inertia, the possibility exists that the load will overrun the motor and cause it to act as a pump when the displacement of the pump is suddenly reduced. When this condition arises, it is, of course, desirable that the hydrostatic transmission afford a high degree of dynamic braking so that the load will be decelerated rather quickly. Transmissions in which each side of the circuit is provided with a high pressure relief valve, or in which a single high pressure relief valve is selectively connected with the higher pressure side by a shuttle valve as in U.S. Patent 2,961,829, granted Nov. 29, 1960, permit creation of a high pressure in either side of the circuit and thus inherently do afford a high degree of dynamic braking under overrun conditions. However, they also present the possibility that excessively high PV factors will be produced. This is so not because the pressure in the return side is raised to a value higher than any which might be produced in the driving side, but because the motor is a fixed displacement unit and thus creates the high pressure at a time when the flow rate through the circuit also is quite high.

The object of this invention is to provide a hydrostatic transmission which affords dynamic braking that may be limited to insure against the creation of excessively high PV factors. According to this invention, the motor is a variable displacement unit of the rotary cylinder barrel, longitudinally reciprocating piston type in which the cam plate adjustment axis is so located that the forces transmitted between the pistons and the cam plate create a moment which urges the cam plate in the direction of its maximum displacement position when the unit is acting as a motor and in the direction of the minimum displacement position when the unit is acting as a pump. In its simplest form, the motor uses a floating cam plate, i.e., one which can move freely under the action of the biasing moment, so that during normal operation when the pump is driving the motor, the cam plate assumes its maximum displacement position and the motor operates as a fixed displacement unit. During an overrun condition, when the motor acts as a pump and drives the pump, the direction of action of the biasing moment acting on the cam plate reverses and the cam plate moves toward the minimum displacement position. This has the effect of reducing the flow rate through the circuit and of reducing the sliding velocity of the pistons and thus keeps the PV factors at the pump and motor within acceptable limits. Preferably the minimum displacement of the motor is materially greater than zero so that a substantial degree of dynamic braking can be obtained. When the overrun condition has abated, the pump again commences to drive the motor and, therefore, the cam plate moves back to the maximum displacement position and normal operation is resumed.

In other embodiments of the invention, the motor is provided with controls which allow selection of motor displacement, and thus increase the speed range of the transmission during normal operation. Controls which program the reduction in motor displacement under overrun conditions in accordance with either pressure or speed or both may also be provided. These last mentioned controls permit a higher degree of dynamic braking since they take into account the fact that the PV factor imposed on the hydraulic units at a given operating pressure decreases as speed and cam angle (i.e., displacement) decrease.

The basic and several alternative embodiments of the invention are described herein in detail with reference to the accompanying drawings in which FIG. 1 is a schematic diagram of the improved transmission incorporating a motor having a floating cam plate.

FIG. 2 is a sectional view taken on line 2—2 of FIG. 1 showing the face of the stationary valve in the motor.

FIG. 3 is a schematic diagram of a portion of an alternative embodiment of the invention employing a motor having a floating cam and a servo control that permits selection of motor displacement during normal operation.

Figure 4:
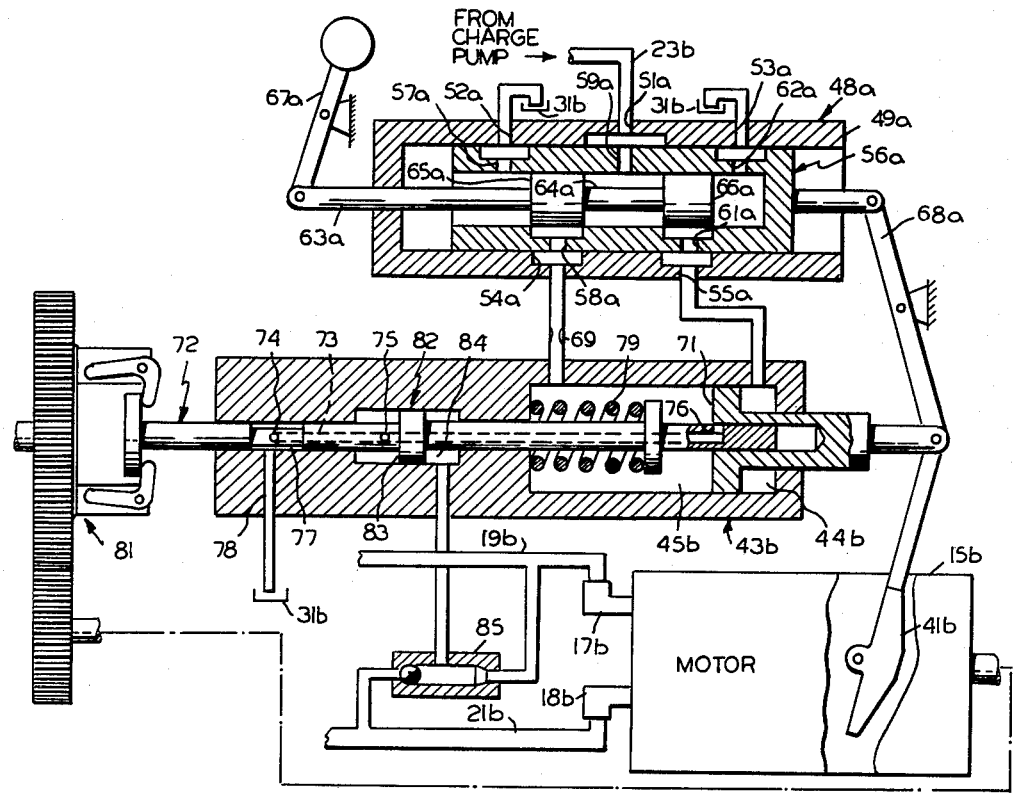
FIG. 4 is a schematic diagram of a portion of another alternative embodiment wherein the cam plate of the motor may be controlled manually during normal operation and automatically during overrun conditions in accordance with both speed and pressure.

As shown in FIG. 1, the transmission includes a reversible, variable displacement pump 11 having a drive shaft 12 connected with a prime mover (not shown) and a pair of ports 13 and 14, a reversible variable displacement motor 15 having a drive shaft 16 connected with the driven load (not shown) and a pair of ports 17 and 18, and a pair of main conduits 19 and 21 which connect the pump and motor in a closed transmission circuit. The transmission circuit is maintained liquid-filled by a charge pump 22 which is driven by the prime mover and is connected with the main conduits through conduit 23 and branch conduits 24 and 25. The branch conduits contain check valves as shown so that the charge pump delivers fluid to whichever of the main conduits is the low pressure conduit and is isolated from the main conduit which is the high pressure conduit. The transmission also is provided with a relief circuit 26 of the type disclosed in U.S. Patent 2,961,829, granted Nov. 29, 1960, which includes low and high pressure relief valves 27 and 28, respectively, and a shuttle valve 29 which responds to the pressure differential between the main conduits and serves to connect the low pressure conduit with the low pressure relief valve 27 and to connect the high pressure conduit with the high pressure relief valve 28. The low pressure relief valve 27 discharges either directly, or indirectly through a heat exchanger, to a reservoir 31 which serves as the source of fluid for charge pump 22.

Pump 11 and motor 15 are both of the rotary cylinder barrel, longitudinally reciprocating piston type, such as those manufactured by my assignee under the trademark Dynapower. The motor 15 includes a cylinder barrel 32 which is connected in driving relation with the shaft 16 by splines (not shown) and which contains a circular series of cylinder bores 33 that receive the pistons 34. At its left end, each cylinder bore terminates in a port which registers sequentially with the arcuate ports 35 and 36 formed in a stationary valve member 37 and connected, respectively, with the main ports 17 and 18. The projecting end of each piston 34 is formed with a spherical head whose center lies in the common plane 38 and which carries a shoe 39 that bears against cam plate 41. The cam plate is supported by two trunnions 42 which are journaled in the housing of the motor and positioned so that their axes are normal to the axis of rotation of cylinder barrel 32 and intersect the last mentioned axis in the plane 38 containing the centers of the spherical end of the pistons. In the complete motor, the shoes 39 are held against the cam plate by a return plate (which has been omitted for reasons of clarity) which is attached to the cam plate and serves to move the pistons on their intake strokes.

Cam plate 41 is connected with the piston of a double-acting motor 43 whose opposed working chambers 44 and 45 are vented to reservoir 31. Therefore, cam plate 41 is free to move under the action of the biasing moment produced by the pistons 34 between the illustrated maximum displacement position and a minimum displacement position defined by a stop sleeve 46 located within motor 43.

Structurally, pump 11 is the same as motor 15 except that its cam plate is arranged for movement in opposite directions from a neutral or zero displacement position and is usually provided with a manual control and a pressure responsive override control. The override control varies pump displacement in inverse relation to the discharge pressure of the pump and thus, during normal driving operation, maintains PV conditions within acceptable limits and also prevents overloading of the prime mover.

Before discussing the operation of the FIG. 1 embodiment, it will be helpful to consider the nature of the biasing moment produced by the motor pistons 34. One component of that moment is attributable to the inertia of the pistons themselves. An inspection of FIG. 1 will reveal that all of the pistons 34 located above the axis of rotation are either moving to the left at the start of their discharge strokes or are moving to the right at the end of their suction or inlet strokes. The cam plate 41 supplies the acceleration forces required to produce these changes in velocity, and since they act to the left, the cam plate 41 experiences an equal and opposite reaction which tends to tilt it in the clockwise direction about the axis of trunnions 42 toward the maximum displacement position. The pistons 34 located below the axis of rotation are either moving to the left at the end of their discharge strokes or moving to the right at the beginning of their inlet strokes. Therefore, these pistons are also subjected to accelerating forces, but in this case the forces act to the right and are supplied by the return plate (not illustrated). However, since the reaction force for the return plate is supplied by the cam plate 41 through the shoes 39 of those pistons 34 located about the axis of rotation, the inertia forces of the pistons 34 located below that axis also urge the cam plate 41 in the clockwise direction. Any piston 34 lying in the horizontal plane containing the axis of rotation exerts no inertia force on the cam plate because it will be in midstroke position where its velocity is a maximum and its acceleration is zero.

Another component of the biasing moment results from the fact that the motor employs an odd number of pistons, usually nine, so that at times the number of pistons located above the axis of rotation which is subjected to high pressure exceeds the number of pistons located below the axis that is subjected to this pressure, and at other times the greater number of pistons subjected to high pressure lies below the axis of rotation. Therefore, the hydraulic forces exerted by the pistons 34, and which equal the product of the pressure in the cylinder bore and the cross-sectional area of the piston, sometimes produce a moment that urges the cam plate 41 in one direction and at other times produce a moment that urges the cam plate in the opposite direction. However, since this reversal in the direction of action of the biasing moment occurs each time a cylinder bore 33 moves from registration with port 35 into registration with port 36, and each time a cylinder bore 33 leaves port 36 and moves into registration with port 35, its frequency is usually so high that it has no effect on the position of cam plate 41.

The final component of the biasing moment is attributable to what I will term an apparent extension of the high pressure port in stationary valve 37. As can be seen in FIG. 2, each of the ports 35 and 36 is physically symmetrical about the cam plate trunnion axis 42' so it would seem that, except for the high frequency reversal in the hydraulic force moment mentioned above, the hydraulic forces exerted on cam plate 41 by the pistons 34 whose cylinder bores are in registration with whichever of ports 35 and 36 is the high pressure port would produce equal and opposite moments on cam plate 41. However, it has been found that rotation of the cylinder barrel causes the pressure distribution over the face of the stationary valve 37 to shift in the direction of rotation. Thus, in FIG. 2, if ports 35 and 36 are the high and low pressure ports, respectively, during normal motoring operation and cylinder barrel 32 is rotating in the direction of arrow 47, the leaving end of high pressure port 35 is extended through an angle B as shown by the dashed line so that in effect the angular extent of that portion of this port located above axis 42' becomes greater than the angular extent of that portion of the port located below axis 42'. This apparent extension of the port 35 increases the number of pistons 34 located above axis 42' that are subjected to high pressure and unbalances the hydraulic force moment acting on cam plate 41. Therefore, during motoring operation, this unbalanced moment supplements the inertia force moment and the cam plate is continuously urged toward its maximum displacement position. During an overrun condition, in which motor 15 acts as a pump and port 36 becomes the high pressure port, the leaving end of this port is extended through the angle B'. Since the angular extension B' is located below axis 42', the hydraulic force moment is unbalanced in the opposite direction and serves to urge the cam plate 41 in the counterclockwise direction toward its minimum displacement position. This unbalanced thrust moment opposes the inertia force moment and the motor components are so designed that under the speed and pressure conditions that are to be encountered in operation, the thrust force moment predominates. Therefore, when motor 15 is pumping, cam plate 41 is biased toward the minimum displacement position.

When the transmission of FIG. 1 is put in service and the operator wants to drive the load in the forward direction, pump 11 is caused to discharge fluid through port 13 to main conduit 19 at a rate selected to afford the desired driving speed. This fluid passes through motor 15, thereby causing the motor to commence to develop driving torque, and is returned to the pump through port 18, main conduit 21 and port 14. Since conduit 19 is the high pressure conduit, shuttle valve 29 assumes the illustrated position in which it connects low pressure relief valve 27 with main conduit 21 and connects high pressure relief valve 28 with main conduit 19. Inasmuch as motor 15 is being driven by the pump 11, the biasing moment acting on cam plate 41 moves this member to and holds it in the illustrated maximum displacement position. Therefore, motor 15 operates as a fixed displacement unit and drives the load at a speed which is a function of the speed and displacement of pump 11.

If the inertia of the driven load is high, a sudden reduction in the displacement of pump 11 can cause it to overrun motor 15 and drive this motor as a pump. When this happens, the pressure in main conduit 19 drops below that in main conduit 21 and shuttle valve 29 shifts to the right and connects these conduits with the low and high pressure relief valves 27 and 28, respectively. Since main conduit 21 is now the high pressure conduit, arcuate port 36 is the high pressure port and it is extended through the angle B'. Therefore, the biasing moment acting on cam plate 41 moves the cam plate to the minimum displacement position defined by stop sleeve 46. This change in the displacement of motor 15 reduces the degree of dynamic braking afforded by the hydrostatic transmission, but insures against development of excessive PV conditions. When the motor and the load have decelerated to the speed dictated by the current displacement of pump 11, main conduit 19 again becomes the high pressure conduit, shuttle valve 29 shifts back to its illustrated position, and the biasing moment acting on cam plate 41 again moves the cam plate to its illustrated maximum displacement position.

When it is desired to drive the load in the reverse direction, pump 11 is caused to discharge fluid through port 14 to main conduit 21. Under this condition of operation, arcuate port 36 in motor 15 is the high pressure port during normal driving operation and the cylinder barrel 32 and shaft 16 rotate in the direction of the dashed arrow 47' in FIG. 2. Arcuate port 36 is now extended through the angle C and, since this extension lies on the same side of the axis 42' as the extension B of port 35 during forward operation, the moment developed by pistons 34 moves cam plate 41 to the maximum displacement position. An overrun condition occurring during the reverse mode of operation causes arcuate port 35 to become the high pressure port and to be extended through the angle C' shown in FIG. 2. Therefore, at this time, the direction of the biasing moment acting on cam plate 41 reverses and the cam plate is moved to the minimum displacement position.

It should be observed that in those embodiments of the invention employing a floating cam plate, as in FIG. 1, and a motor whose minimum displacement is zero, the cam plate will not automatically return to the maximum displacement position when normal driving operation is resumed after the motor has been brought to rest by the dynamic braking afforded by the transmission. In these cases, a light spring is used to move the cam plate away from the zero displacement position.

As mentioned above, the speed of the load in the FIG. 1 embodiment depends only upon the displacement and speed of pump 11 since the motor 15 acts as a fixed displacement unit under normal driving conditions. In installations requiring a greater range of driving speed, the embodiment shown in FIG. 3 may be used. This embodiment is the same as the first one except for the inclusion of the manually operated servo control so only a portion of it is illustrated and corresponding parts bear the same reference numerals with the postscript $a$ added for clarity. In the second embodiment, the position of cam plate 41a may be controlled manually under normal driving conditions by a servo valve 48 which includes a housing 49 formed with an inlet passage 51 which is connected with the charge pump through conduit 23a, a pair of exhaust passages 52 and 53 which are in continuous communication with reservoir 31a, and a pair of outlet passages 54 and 55, the former being plugged and the latter being connected with the working chamber 44a of motor 43a. Reciprocable in housing 49 is a valve sleeve 56 which is formed with five longitudinally spaced radial passages 57, 58, 59, 61 and 62 and which receives the sliding valve plunger 63. This valve plunger is formed with an annular groove 64 and a pair of lands 65 and 66 which in the illustrated position of the plunger relative to the sleeve 56, close radial passages 58 and 61, respectively. Valve plunger 63 is shifted manually by a lever 67 while a follow-up connection 68 is provided for shifting valve sleeve 56.

In FIG. 3, the components of the transmission are shown in the positions they assume under normal driving conditions with the motor operating at maximum displacement. At this time, valve land 66 overlies radial passage 61 so motor 43a is hydraulically locked against movement under the action of the biasing moment acting on cam plate 41a. To increase driving speed, the operator swings lever 67 in the counterclockwise direction about its pivot to thereby shift valve plunger 63 to the right and allow annular groove 64 to interconnect radial passages 59 and 61. Fluid under pressure from the charge pump may now flow to the working chamber 44a of motor 43a via conduit 23a, inlet passage 51, radial passage 59, annular groove 64, radial passage 61 and outlet passage 55, where it is effective to cause motor 43a to move cam plate 41a in the displacement-decreasing direction. As the cam plate commences to move, follow-up connection 68 shifts valve sleeve 56 to the right, with the result that when the cam plate reaches the new reduced displacement position selected by the operator, the valve sleeve will have reached the illustrated null position with respect to valve plunger 63 and have terminated flow to working chamber 44a. At this time, motor 43a will again be hydraulically locked against rightward movement. Since the displacement of the motor has been reduced, its speed, and consequently the speed of the driven load, will have increased.

A reduction in driving speed is effected by shifting valve plunger 63 in the opposite direction relatively to valve sleeve 56. In this case, land 66 uncovers radial passage 61 and allows it to communicate with radial passage 62 through the interior of the valve sleeve. Since interconnection of these radial passages vents working chamber 44a to reservoir 31a, the biasing moment developed by the motor pistons 34a is effective to move cam plate 41a in the displacement-increasing direction. As this movement progresses, follow-up connection 68 shifts valve sleeve 56 to the left and, when the cam plate 41a has reached the increased displacement position corresponding to the new position of lever 67, the valve sleeve 56 will have been returned to the null position with respect to the valve plunger 63 and motor 43a will be hydraulically locked.

When the load in the FIG. 3 embodiment overruns motor 15a, the biasing moment acting on cam plate 41a changes direction, and, since the working chamber 45a of motor 43a is vented to reservoir 31a, this moment moves the cam plate 41a to the minimum displacement position defined by stop sleeve 46a. As this movement proceeds, follow-up connection 68 shifts valve sleeve 56 to the right relatively to valve plunger 63 and opens communication between working chamber 44a and reservoir 31a so that this working chamber is maintained liquid-filled and cavitation is avoided. When the overrun condition ends, the biasing moment developed by pistons 34a again urges cam plate 41a toward the maximum displacement position. Therefore, the cam plate will move in this direction until sleeve 56 is again returned to a null position with respect to valve plunger 63, i.e., until the cam plate is returned to the position called for by lever 67.

As in the first embodiment, the stop sleeve 46a in FIG. 3 serves to limit the minimum displacement of the motor 15a to a value materially greater than zero so that the transmission will afford a rather high degree of dynamic braking under overrun conditions. In addition, under normal driving conditions the presence of this stop prevents the operator from selecting an excessive motor speed and insures that the motor always will develop the minimum torque required by the driven load.

The third embodiment of the invention, shown in FIG. 4, includes the manually operated servo control of the second embodiment, and in addition incorporates speed and pressure controls for programming the reduction in motor displacement under overrun conditions. In the FIG. 4 embodiment, the cam plate 41b is positioned by a double-acting motor 43b whose opposed working chambers 44b and 45b are connected with the outlet passages 55a and 54a, respectively, of a servo valve 48a which is identical to the valve 48 of FIG. 3 except that outlet passage 54a is not plugged. The connection between chamber 45b and outlet pasasge 54a is provided with a choke or metering orifice 69. The piston 71 of motor 43b is formed with an axial bore which receives one end of a spindle 72 containing an axial bore 73 which is intersected by three longitudinally spaced radial passages 74, 75 and 76. Radial passage 74 is in continuous communication with reservoir 31b through an annular groove 77 formed in the spindle and an exhaust passage 78, and radial passage 76 and the adjacent portion of piston 71 constitute a variable area orifice through which working chamber 45b communicates with axial bore 73, and consequently with reservoir 31b. The spindle 72 is biased to the right by a coil compression spring 79 and is shifted to the left against this bias by a speed sensor 81 which responds to the speed of motor 15b and by a fluid pressure motor 82. The motor 82 includes a piston 83, defined by an enlargement of spindle 72, and a working chamber 84 which is selectively connected with whichever of the main conduits 19b and 21b is the high pressure conduit by a shuttle valve 85.

Under normal driving conditions, the cam plate 41b of motor 15b in the FIG. 4 embodiment is biased toward the illustrated maximum displacement position and is positioned in accordance with the setting of servo control valve 48a. The cam plate 41b is shown in the maximum displacement position and can be moved to a reduced displacement position by shifting valve plunger 63a to the right. This movement of the valve plunger causes annular groove 64a to interconnect radial passages 59a and 61a and allows radial passages 58a and 57a to communicate through the interior of valve sleeve 56a, with the result that fluid under pressure from the charge pump is delivered to working chamber 44b and working chamber 45b is vented to reservoir 31b. Motor 43b now moves cam plate 41b in the displacement-reducing direction against the opposition of the biasing moment and, when the cam plate reaches the position corresponding to the new setting of lever 67a, follow-up connection 68a will have returned valve sleeve 56a to the null position with respect to valve plunger 63a and will have again hydraulically locked motor 43b. The displacement of motor 15b may be increased, and the driving speed decreased, by shifting valve plunger 63a to the left relatively to valve sleeve 56a to thereby cause annular groove 64a to interconnect radial passages 58a and 59a and to allow radial passages 61a and 62a to communicate with each other through the interior of valve sleeve 56a. Motor 43b now acts in aid of the biasing moment developed by the pistons of motor 15b and moves cam plate 41b in the displacement-increasing direction. When correspondence between the positions of cam plate 41b and lever 67a is again established, valve sleeve 56a will be in a null position relative to valve plunger 63a and motor 43b will be hydraulically locked.

As in the preceding embodiments, cam plate 41b is biased toward the minimum displacement position under overrun conditions. However, unlike the first two transmissions, the cam plate in the third embodiment does not necessarily move to the minimum displacement position but assumes a position dependent upon motor speed and pressure. If the overrun condition is severe, so that the pressure in conduit 21b is high, and it occurs at a time when motor speed also is high, speed sensor 81 and motor 82, which is now connected with main conduit 21b by shuttle valve 85, will move spindle 72 to the left and uncover radial passage 76. Fluid in chamber 45b may now escape to reservoir 31b through radial passage 76, axial bore 73, radial passage 74, annular groove 77 and exhaust passage 78, and, because of the presence of choke 69, the pressure in working chamber 45b decreases. As a result, the biasing moment acting on the cam plate 41b moves it in the displacement-decreasing direction. As the cam plate moves, follow-up connection 68a shifts valve sleeve 56a to the right from the null position with respect to valve plunger 63a, and thus opens a supply path from the charge pump to working chamber 45b and an exhaust path from working chamber 44b to reservoir 31, and piston 71 moves to the left and commences to close radial passage 76. When the throttling effect at radial passage 76 resulting from this following movement of piston 71 establishes a pressure in working chamber 45b that balances the biasing moment acting on cam plate 41b, the parts come to rest. The magnitude of the reduction in the displacement of motor 15b which has been effected depends upon the speed of motor 15b and the pressure in main conduit 21b since these quantities govern the distance speed sensor 81 and motor 82 shift spindle 72, and consequently, the distance piston 71 must travel to recreate a balancing pressure in working chamber 45b.

As motor 15b decelerates and the pressure in main conduit decreases, spring 79 commences to shift spindle 72 to the right and increase the throttling effect at radial passage 76. This raises the pressure in working chamber 45b and causes motor 43b to shift cam plate 41b in the displacement-increasing direction against the opposing bias developed by the motor pistons. The rightward movement of piston 71 continues until the throttling effect at radial passage 76 again establishes a pressure in working chamber 45b that places in equilibrium the moments acting on cam plate 41b. The controls continue to function in this manner until the overrun condition has ended and cam plate 41b has been returned to the position corresponding to the position of lever 67. Since the controls of the third embodiment always establish the greatest motor displacement permissible under the prevailing speed and pressure conditions, it will be apparent that this embodiment affords the maximum degree of dynamic braking consistent with safe PV conditions.

During reverse operation the controls of the FIG. 4 embodiment function in the same manner except that in the case the pumping action of motor 15b develops a high pressure in main conduit 19b so shuttle valve 85 connects this main conduit with working chamber 84.

It should be observed that motor 82 and speed sensor 81 of the FIG. 4 embodiment are effective to shift spindle 72 to the left under normal driving conditions as well as under overrun conditions. However, since the cam plate 41b of motor 15b always is biased toward its maximum displacement position during normal operation, the variations in pressure in working chamber 45b resulting from changes in the degree of throttling at radial passage 76 have no effect upon the position of the cam plate at this time. It should also be noted that while the FIG. 4 embodiment employs a manual control as well as both speed and pressure controls, it will be obvious that a speed control or a pressure control may be used by itself or with the manual control.

Figure 5:
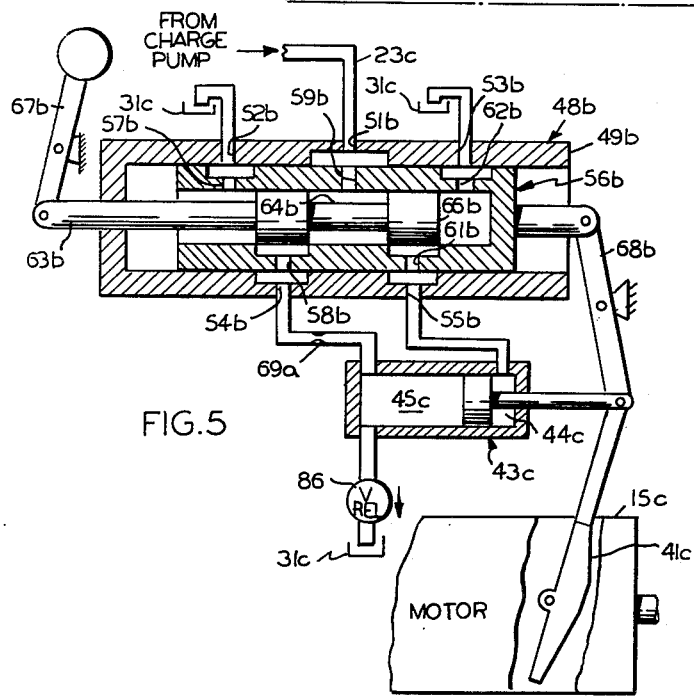
FIG. 5 is a schematic diagram of a portion of another embodiment employing both manual and programmed controls for the cam plate of the motor.

The final embodiment of the invention, shown in FIG. 5, employs a manually operated servo control identical to the one used in tht FIG. 4 embodiment, but in lieu of the speed and pressure controls employed in the last embodiment, programming of the reduction in displacement of motor 15c in this form of the invention is effected by a relief valve 86 which is connected with the working chamber 45c of motor 43c and discharges to reservoir 31c. This relief valve 86 maintains a substantially constant pressure in working chamber 45c which, under overrun conditions, is used to balance the biasing moment exerted on cam plate 41c by the motor pistons and which is so chosen that the pressure developed by the pumping action of motor 15c never exceeds the maximum pressure allowable by the design value of the PV factor when the motor is operating at maximum displacement and at the maximum driving speed.

Under normal driving conditions, the FIG. 5 embodiment functions in much the same way as the FIG. 4 embodiment. In order to decrease the displacement of motor 15c, and thus increase driving speed, the operator shifts valve plunger 63b to the right to thereby open a supply path to working chamber 44c including conduit 23c, inlet passage 51b, radial passage 59b, annular groove 64b, radial passage 61b and outlet passage 55b, and to open an exhaust path from working chamber 45c to reservoir 31c including outlet passage 54b, radial passages 58b and 57b, and exhaust passage 52b. As the cam plate 41c moves in the displacement-reducing direction, follow-up connection 68b shifts valve sleeve 56b to the right, and when the cam plate reaches the position corresponding to the new position of lever 67b the parts come to rest. Shifting of valve plunger 63b in the opposite direction has the effect of opening a supply path from the charge pump to working chamber 45c and of opening an exhaust path from working chamber 44c to reservoir 31c, so in this case, motor 43c aids the biasing force exerted by the motor pistons and moves the cam plate in the displacement-increasing direction.

When the FIG. 5 embodiment encounters an overrunning load and the direction of action of the biasing moment acting on cam plate 41c reverses, cam plate 41c will be urged toward the minimum displacement position with a force which varies in part with the pressure in the main conduit to which the motor is discharging. If this pressure exceeds the allowable maximum, relief valve 86 will open and permit movement of the cam plate in the displacement-reducing direction. As soon as this movement commences, follow-up connection 68b shifts valve sleeve 56b to the right and opens a supply path from the charge pump to working chamber 45c and an exhaust path from working chamber 44c to reservoir 31c. The resulting reduction in the displacement of motor 15c has the effect of decreasing the discharge pressure of the motor and, when this pressure is restored to the allowable maximum, the moments acting on cam plate 41c will be in equilibrium so the cam plate will come to rest. As motor speed decreases as a result of the dynamic braking afforded by the transmission, the discharge pressure of the motor will tend to decrease, and motor 43c will commence to move cam plate 41c back toward the position called for by lever 67b. When normal driving operation has been resumed, the controls will have been returned to their illustrated positions (assuming that the cam plate was in its maximum displacement position when the overrun occurred) and relief valve 86 will close. The controls of the FIG. 5 embodiment are insensitive to direction of operation and, therefore, they function as described in both the forward and the reverse modes of operation. It is obvious from the nature of the controls provided in FIG. 5 that this embodiment does not afford as high a degree of dynamic braking under all conditions as the FIG. 4 embodiment. However, its devices are less expensive to build and are adequate in cases where optimum performance is not required.

The drawings and description presented herewith relate only to several illustrative embodiments of the invention. Since changes can be made in the structures of these embodiments without departing from the inventive concept, the following claims should provide the sole measure of the scope of the invention.

What I claim is:

1. A hydrostatic transmission comprising
   (a) a pump;
   (b) a motor;
   (c) means interconnecting the pump and motor in a closed transmission circuit, said circuit constituting the sole power transmitting link between the pump and motor and affording one side in which a high pressure can be developed when the pump is driving the motor and another side in which high pressure can be developed when the motor is driving the pump,
   (d) the motor being of the rotary cylinder barrel, longitudinally reciprocating piston type and having a cam plate for varying displacement that is biased toward minimum and maximum displacement positions, respectively, by the forces transferred between the cam plate and the pistons when the motor is driving the pump and the pump is driving the motor; and
   (e) means, including said pistons which develop the biasing forces, for controlling the position of the cam plate when the pump is driving the motor, and for automatically moving the cam plate to a reduced displacement position upon the occurrence of an overrun condition that causes the motor to drive the pump.

2. A hydrostatic transmission as defined in claim 1
   (a) in which the minimum displacement of the motor is materially greater than zero; and
   (b) wherein the means for controlling the position of the cam plate consists solely of said pistons which develop the biasing forces, whereby the cam plate assumes the maximum displacement position whenever the pump is driving the motor and assumes the minimum displacement position whenever the motor is driving the pump.

3. A hydrostatic transmission as defined in claim 1 wherein the means for controlling the position of the cam plate also includes
   (a) a fluid pressure control motor for moving the cam plate toward the minimum displacement position; and
   (b) control means for selectively venting and pressurizing the control motor to thereby allow the biasing forces developed when the pump is driving the motor to move the cam plate in the displacement increasing direction or cause the control motor to move the cam plate in the displacement decreasing direction against the opposition of said biasing forces.

4. A hydrostatic transmission as defined in claim 1 wherein the means for controlling the position of the cam plate also includes
   (a) a fluid pressure control motor for moving the cam plate toward the maximum displacement position; and
   (b) valve means responsive to the pressure in said another side of the circuit for venting and pressurizing the control motor as the pressure in said another side increases above and decreases below a predetermined value.

5. A hydrostatic transmission as defined in claim 4
   (a) in which the motor and pump are reversible; and
   (b) including means for connecting the valve means with whichever side of the transmission circuit is at the higher pressure.

6. A hydrostatic transmission as defined in claim 1 wherein the means for controlling the position of the cam plate also includes (a) first and second fluid pressure control motors for moving the cam plate toward the minimum and maximum displacement positions, respectively;

(b) a source of control fluid under pressure and a reservoir;

(c) a first control valve connected with the source, the reservoir and the two control motors and having two movable elements, the elements being movable in one relative direction to connect the first and second control motors with the source and the reservoir, respectively, and in the opposite relative direction to connect the first and second control motors with the reservoir and the source, respectively;

(d) a follow-up connection between the cam plate and one of the elements of the first control valve arranged to shift that element in said one and said opposite relative directions as the cam plate moves toward the maximum and minimum displacement positions, respectively;

(e) means for shifting the other element of the first control valve in said one and said opposite relative directions;

(f) a second control valve connected with the reservoir and the second control motor and having a pair of movable elements, movement of the elements in one relative direction progressively opening communication between the second control motor and the reservoir and movement of the elements in the opposite relative direction progressively closing communication between the second control motor and the reservoir;

(g) means connecting one element of the second control valve with the cam plate so that the element is moved in said one and said opposite relative directions as the cam plate moves toward the maximum and minimum displacement positions, respectively;; and (h) motor means responsive to the pressure in said another side of the transmission circuit for moving the other element of the second control valve in said one and said opposite relative directions as the pressure in said another side increases and decreases, respectively.

7. A hydrostatic transmission as defined in claim 6
(a) in which the pump and motor are reversible; and
(b) wherein the motor means (g) includes
(1) means biasing said other element of the second control valve in said opposite relative direction,
(2) a valve motor for shifting said other element of the second control valve in the said one relative direction against the bias exerted by the biasing means, and
(3) a shuttle valve for connecting the valve motor with whichever of the two sides of the transmission circuit is at the higher pressure.

8. A hydrostatic transmission as defined in claim 7 including a flow restrictor interposed in the connection between the first control valve and the second control motor.

9. A hydrostatic transmission as defined in claim 6 including means responsive to the speed of the motor for shifting the said other element of the second control valve in said one relative direction as motor speed increases.

10. A hydrostatic transmission as defined in claim 7 including means responsive to the speed of the motor for shifting the said other element of the second control valve in said one relative direction as motor speed increases.

11. A hydrostatic transmission as defined in claim 10 including a flow restrictor interposed in the connection between the first control valve and the second control motor.

12. A hydrostatic transmission as defined in claim 1 wherein the means for controlling the position of the cam plate also includes
(a) a fluid pressure control motor for moving the cam plate toward the maximum displacement position;
(b) means for delivering fluid under pressure to the control motor; and
(c) a relief valve connected with the control motor.

13. A hydrostatic transmission as defined in claim 1 wherein the means for controlling the position of the cam plate also includes
(a) first and second control motors for moving the cam plate toward the minimum and maximum displacement positions, respectively;
(b) a source of control fluid under pressure and a reservoir;
(c) a control valve connected with the source, the reservoir and the two control motors and having two movable elements, the elements being movable in one relative direction to connect the first and second control motors with the source and the reservoir, respectively, and in the opposite relative direction to connect the first and second control motors with the reservoir and source, respectively;
(d) a follow-up connection between the cam plate and one of the elements of the control valve arranged to shift that element in said one and said opposite relative directions as the cam plate moves toward the maximum and minimum displacement positions, respectively;
(e) means restricting flow from the control valve to the second control motor; and
(f) a relief valve connected with the second control motor and the reservoir and arranged to allow flow from the motor to the reservoir upon the occurrence of a predetermined pressure in the control motor.

14. A hydrostatic transmission as defined in claim 1 wherein the means for controlling the position of the cam plate also includes
(a) a fluid pressure control motor for moving the cam plate toward the minimum displacement position;
(b) a source of control fluid under pressure and a reservoir;
(c) a control valve connected with the source, the reservoir and the control motor and having two movable elements, the elements being movable in one relative direction to connect the control motor with the source and in the opposite relative direction to connect the control motor with the reservoir;
(d) a follow-up connection between the cam plate and one of the elements of the control valve arranged to shift that element in said one and said opposite relative directions as the cam plate moves toward the maximum and minimum displacement positions, respectively; and
(e) manually operable means for shifting the other element of the control valve in said one and said opposite relative directions.

References Cited by the Examiner

UNITED STATES PATENTS

| | | | |
|---|---|---|---|
| 2,554,047 | 5/1951 | Moon | 60—53 |
| 2,874,533 | 2/1959 | Schott | 60—19 |
| 2,961,829 | 11/1960 | Weisenbach | 60—53 |
| 3,054,263 | 9/1962 | Budzich | 60—53 |

SAMUEL LEVINE, *Primary Examiner.*

EDGAR W. GEOGHEGAN, *Examiner.*